O. E. NILSEN.
DISTRIBUTING VALVE.
APPLICATION FILED OCT. 2, 1911.
1,030,604.
Patented June 25, 1912.
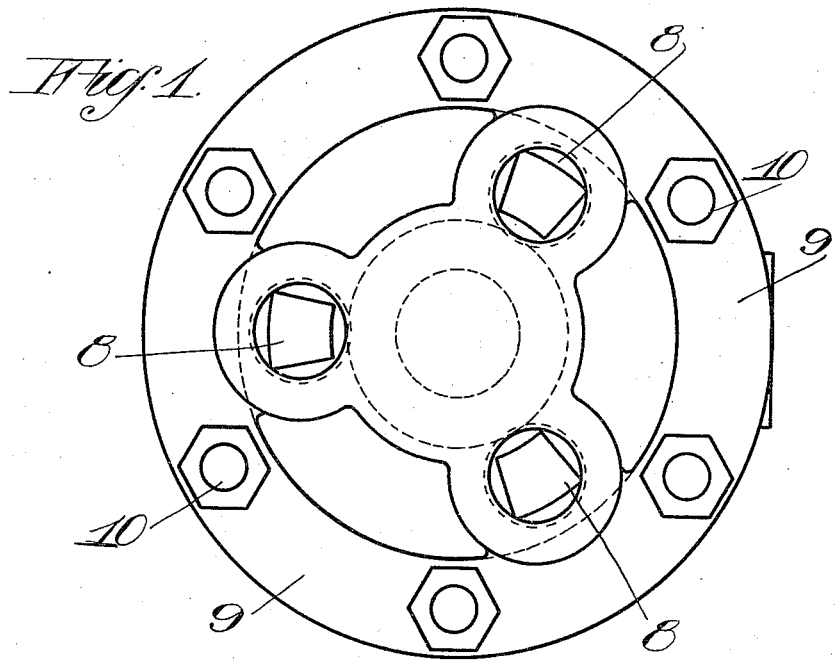
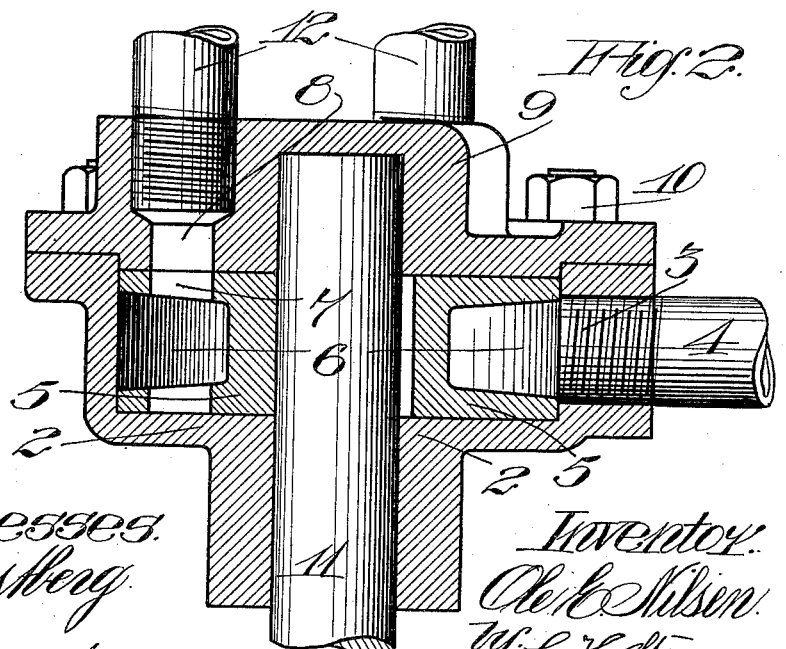
Witnesses
T. Rasberg
F. E. Maynard
Inventor:
Ole E. Nilsen
by G. H. Strong.
his Atty.

UNITED STATES PATENT OFFICE.

OLE E. NILSEN, OF SEATTLE, WASHINGTON.

DISTRIBUTING-VALVE.

1,030,604.  Specification of Letters Patent.  Patented June 25, 1912.

Application filed October 2, 1911. Serial No. 652,324.

*To all whom it may concern:*

Be it known that I, OLE E. NILSEN, citizen of the United States, residing at Seattle, in the county of King and State of Washington, have invented new and useful Improvements in Distributing-Valves, of which the following is a specification.

This invention relates to valves, and particularly to distributing valves adaptable for use in combination with means whereby a rotary motion may be imparted to a member of the valve.

The present invention is designed with a special object of providing a controlling and distributing valve, whereby the passage of fluid under pressure may be nicely determined in certain relation to the pistons of reciprocating engines, or where other parts are to be operated under the impulse of fluids under pressure.

The invention consists of the parts and the construction and combination of parts, as hereinafter more fully described and claimed, having reference to the accompanying drawings, in which—

Figure 1 is a plan view of the valve. Fig. 2 is a transverse, central section through the valve.

In the illustrated embodiment of my invention 2 represents a suitably shaped housing or casing, having an inlet port 3, to which may be connected a pipe or other conductor 4, for the conveyance of fluid under pressure to the interior of the casing 2. Within the casing 2 is rotatable a valve member 5, having circular flanges or disks sufficiently spaced apart to form a continuous, annular chamber 6, into which the fluid under pressure enters from the pipe 4. The valve member 5 is provided with a suitably shaped port 7 in its flanged faces, which port is adapted to register successively with a series of ports 8, equally spaced in a cap or cover 9, fastened by screws 10, or other suitable devices, to the valve casing 2. The rotary member 5 of the valve is suitably fastened to a shaft 11, journaled in the casing 2 and the cap 9, and the shaft may be driven by power derived from the engine or machine upon which the valve is mounted. The fluid, when permitted to enter the chamber 6 from the pipe 4, escapes through the port 7 in the valve, 5, when the port, 7 registers with any of the ports 8 in the cap 9, and is conducted thence from the cap 9, through conductors or pipes 12, which may be connected to the engine or machine upon which the device is mounted.

When the distributing valve is to be used in connection with internal combustion engines, or other machines having parts movable by fluid under pressure, the pipes 12 are connected to the machines so that the fluid under pressure can be conveyed into the chambers behind the fluid driven parts in the machines. Hence, when it is desired to start the machine on which the distributer valve 5 is mounted, fluid under pressure is permitted to flow from the pipe 4, into the chamber 6 within the casing 2; thence will pass through the port 7 into whichever of the ports 8 is in registration with the port 7, so that the fluid which is under pressure is conveyed from that port, which is communicating with the port 7, to that chamber of the machine in which there is a part to be driven, wherein the fluid may be operative to move the movable member within the chamber.

Manifestly, the valve herein disclosed is adapted for various uses, and each of the several delivery pipes may be connected to any portion of a machine or engine to which it is desired to deliver fluid under pressure for any purpose.

In operation when it is desired to permit fluid to flow into any of the distributing pipes 12, the fluid is allowed to pass through a valve, not shown, into the conductor 4, and thence into the chamber 6 in the valve casing 2. If the port 7 in the valve member 5 be in intersecting relation with any of the ports 8 in the cap 9, then the fluid under pressure will flow through the port 7 into that particular connecting port 8; thence through its respective conductor 12 and the desired place of operation.

Manifestly, the area of the port 7, and of the several ports 8, may be designed to meet any special requirements, and, should the rotary valve member 5 stop in any position at which the port 7 would not intersect with one of the ports 8, then by simply applying power to the shaft 11 the valve member 5 would be turned sufficiently to open the next successive port 8 in line of rotation of the valve member 5.

Having thus described my invention, what I claim and desire to secure by Letters Patent, is—

1. A distributer valve, including a suitable casing, a ported cap attachable to the casing, a rotatable valve member inclosed in the casing by said cap, said valve member having spaced flanges and a circumferential chamber, and having a port adapted to register with the ports in the cap, and means for delivering fluid into the chamber of the valve.

2. A distributer valve, including a suitable casing, a ported cap attachable to the casing, a rotatable valve member inclosed in the casing by said cap, said valve member having spaced flanges and a circumferential chamber, and having a port adapted to register with the ports in the cap, means for delivering fluid into the chamber of the valve, and means for rotating said valve member.

3. A distributer valve, including a substantially circular casing, a rotary disk-shaped valve mounted in the casing, said valve having a circumferential chamber formed by flanges at top and bottom thereof, a cap for the casing above said valve, a shaft connected to the valve, for rotating the latter, a series of fluid conductors connected to the cap, and means for conveying fluid to the valve chamber, one of said flanges having a port adapted to register with the said fluid conductors.

In testimony whereof I have hereunto set my hand in the presence of two subscribing witnesses.

OLE E. NILSEN.

Witnesses:
ROLLIN SANFORD,
F. W. GARDNER.

---

Copies of this patent may be obtained for five cents each, by addressing the "Commissioner of Patents, Washington, D. C."